United States Patent [19]

Daniel

[11] 4,086,199

[45] Apr. 25, 1978

[54] LATICES OF POLYMER PARTICLES COMPRISING A CORE CONTAINING A VINYL POLYMER AND A PERIPHERY CONTAINING A POLYMER HAVING —CN GROUPS

[75] Inventor: Jean-Claude Daniel, Fontenay sous Bois, France

[73] Assignee: Rhone-Poulenc Industries, Paris, France

[21] Appl. No.: 713,055

[22] Filed: Aug. 9, 1976

[30] Foreign Application Priority Data

Aug. 22, 1975 France .................................. 75 26057

[51] Int. Cl.² ................................................ C08L 9/04
[52] U.S. Cl. ..................... 260/29.7 UP; 260/29.6 RB
[58] Field of Search ................. 260/29.7 UP, 29.6 RB

[56] References Cited

U.S. PATENT DOCUMENTS

| 3,424,706 | 1/1969 | Smith et al. ................. 260/29.6 RB |
| 3,426,102 | 2/1969 | Solak et al. .................. 260/29.7 UP |
| 3,562,235 | 2/1971 | Ryan ............................ 260/29.7 UP |
| 3,657,172 | 4/1972 | Gallagher et al. ........... 260/29.7 RB |
| 3,663,655 | 5/1972 | Stuart ........................... 260/29.7 UP |
| 3,742,092 | 6/1973 | Duke et al. .................. 260/29.6 RB |
| 4,017,442 | 4/1977 | Gibbs et al. ................. 260/29.7 UP |

Primary Examiner—M. J. Welsh
Attorney, Agent, or Firm—McDougall, Hersh & Scott

[57] ABSTRACT

Latices in which the particles, of uniform diameter from 0.2 to 2 μm, comprise a core of vinyl homo or copolymers or of vinyl-diene copolymers with less than 15% of diene, and a periphery formed by a copolymer having —CN groups.

27 Claims, No Drawings

LATICES OF POLYMER PARTICLES COMPRISING A CORE CONTAINING A VINYL POLYMER AND A PERIPHERY CONTAINING A POLYMER HAVING —CN GROUPS

The invention relates to a new latices of polymers which have —CN groups and can be used in biology. It also relates to a method of preparing such latices.

It is known that some biological reagents are obtained by physically or chemically fixing proteins onto particles of polymers in emulsion. It has also been proposed to use calibrated latices of styrene home or copolymers, in which all the particles have the same diameter and the area is consequently known. But proteins are adsorbed physically on the polymer and consequently the reagents formed, having short life, have little sensitivity or reliability with the passage of time.

Furthermore, in order to fix proteins by covalent chemical bonds, the carriers must have groups capable of reacting with the reactive groups in the proteins. These may, for example, be groups with carboxyl or amine functions. Latices in which the polymers have carboxyl functions are easy to prepare and have been commercialized, but this is not so with latices in which the polymers have an amine function. Latices of polymers with an amine function, obtained by hydrogenating homo or copolymers of various nitriles, are in fact known. However, particles of such latices have a wide, uncontrollable spread of particle sizes, which means that the area of the particles may vary from one test to another, the quantity of reactive groups at the surface may vary and hence the quantity of protein fixed may vary and it may not be possible to reproduce the reagents.

Latices of polymers according to the invention do not have these drawbacks. Their particle size may be controlled, their area does not vary from one test to another, they are easy to hydrogenate, and the constant quantity of their reactive groups at the surface makes the bioligical reagents, for which they from the carrier, perfectly reproducible and highly reliable.

These latices are aqueous dispersions of polymers, the particles of which have a uniform diameter from 0.2 to 2 μm and comprise a core of vinyl homo or copolymer or vinyldiene copolymer with less than 15% by weight of diene, and a periphery formed by a copolymer having a large number of —CN groups.

The concentration of particles of polymers in the latex is generally from 1 to 70% and preferably from 5 to 50% by weight. However, this is not essential and any dilution of the latex is possible, depending on the application envisaged, without destroying the latex.

The particles in the latex are calibrated, that is to say, all the particles have the same diameter from 0.2 to 2 μm, an the variation from one particle to another is less than 10%.

The core of the particle, which represents 50 to 90% by weight of the particle, may comprise a possibly cross-linked homo or copolymer of vinyl monomers such as styrene, methylstyrenes, vinyltoluene, ethylvinylbenzene, or alkyl acrylates and methacrylates in which the alkyl group contains 1 to 10 carbon atoms; or it may comprise a possibly cross-linked copolymer of the same vinyl monomers with less than 15% by weight of a diene monomer, such as butadiene and its derivatives.

The copolymer at the periphery, which represents 10 to 50% of the particle, is formed by a vinyl or diene monomer and a monomer containing —CN groups which are be copolymerized with the vinyl or diene monomer. The vinyl or diene monomer, which is selected from the monomers which may form the core of the particle, may be identical with or different from the monomer forming the core.

The monomer containing —CN groups is of general formula

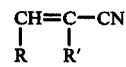

in which R and R', which may be similar or different, represent an atom of hydrogen, an alkyl group containing 1 to 5 carbon atoms or an aryl group. Special examples are acrylo, methacrylo, ethacrylo, crotyl and cinnamyl nitriles. The monomer containing —CN groups is bound in the copolymer in an amount within the range of 20 to 45% by weight of the copolymer.

According to the invention, the polymer latices are prepared by polymerizing one or more vinyl monomers or a mixture of vinyl monomer and less than 15% by weight of a diene monomer in aqueous emulsion, in the presence of an initiator and at least one emulsifier, followed by polymerization of a mixture of a vinyl or diene monomer and a monomer containing —CN groups in aqueous emulsion, in the presence of an initiator, by continuous introduction of the monomers and at least one emulsifier.

Some examples of the vinyl or diene monomers which are used along or mixed to form the core of the particles are, in the case of vinyl monomers, styrene, methylstyrene, vinyltoluene, ethylvinylbenzene and alkyl acrylates and methacrylates in which the alkyl group contains 1 to 10 carbon atoms and, in the case of dienes, butadiene and its derivatives.

These may be associated with a cross-linking vinyl monomer such as divinylbenzene, divinylether, mono or polyethylene glycol dimethacrylates, vinyl methacrylate, triallyl cyanurate or diallyl phthalate, in a quantity ranging from 0.1 to 10% and preferably from 0.1 to 3% by weight of the monomer or monomers. The presence of the cross-linking monomer gives the polymer particles greater resistance to solvents.

All or some of the monomer or monomers are used before polymerization, the remainder being introduced in successive portions or continuously during polymerization. The monomer or monomers may equally be introduced right through the polymerization process, either in successive portions or continuously.

The initiator used must be soluble in water or must give water-soluble radicals by decomposition. These are known products such as ammonium persulphate or potassium persulphate, azonitriles, hydrogen peroxide and redox systems.

The initiator is added to the reaction mixture in quantities ranging from 0.01 to 3% and preferably from 0.1 to 1% by weight of the monomer or monomers, before or during polymerization, either all at once, in successive portions or continuously.

The emulsifier is selected from conventional anionic emulsifiers such as: salts of fatty acids; alkaline alkyl sulphates, alkylsulphonates, alkylarylsulphonates, alkylsulphosuccinates and alkylphosphates; alkyl sulphosuccinates; sulphonates of alkylphenolpolyglycol ethers;

salts of esters of alkylsulphopolycarboxylic acids; condensation products of fatty acids with oxy and amino alkanesulphonic acids; sulphate derivatives of polyglycol ethers; sulphate esters of fatty acids and polyglycols; and alkanolamides of sulphated fatty acids.

The emulsifier may possibly be associated with a non-ionic emulsifier, such as fatty esters of polyalcohols, alkanolamides of fatty acids, polyoxides of ethylene, copolyoxides of ethylene and propylene, and oxyethylene alkylphenols.

The emulsifier or emulsifiers are used in quantities ranging from 0.1 to 10% and preferably from 0.1 to 5% by weight of the monomer or monomers, by addition before and/or during polymerization. More particularly, their continuous addition, simultaneously with the monomer or monomers, enables standardized particles of core polymer to be obtained.

The quantity of water used in polymerizing the core must be such that the monomer or monomers to be polymerized represent 1 to 60% by weight of the reaction medium.

The polymerization temperature, which is a function of the initiator used, is generally within the range of 5 to 90° C.

In the preparation of the copolymer which forms the periphery of the particles, the vinyl or diene monomer is selected from the monomers used in preparing the core. This monomer may be the same as or different from that forming the core. The monomer containing —CN groups, which is copolymerizable with the vinyl or diene monomer, has the general formula

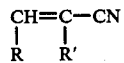

wherein R and R', which may be similar or different, represent an atom of hydrogen, an alkyl group with 1 to 5 carbon atoms or an aryl group. Special examples are acrylo-, methacrylo-, ethacrylo, crotyl and cinnamyl nitriles. This monomer represents 20 to 45% by weight of the mixture of monomers, and the mixture of monomers represents 10 to 50% by weight of the total polymer to be obtained.

The initiator is selected from those mentioned above for polymerizing the core. It may be the same as or different from that used for preparing the core. The proportions are again from 0.01 to 3% and preferably 0.1 to 1% by weight of the monomers. It is either all added to the reaction mixture before polymerization, or it is added during polymerization, in successive portions or continuously.

The initiator required for polymerizing the monomers at the periphery may equally be added to the same time as that required for polymerizing the core, allowances being made for the quantity of monomers which will be used in the second phase of polymerization of monomers to produce the periphery.

The emulsifier, which is selected from those mentioned above and may be identical with or different from that used in preparing the core, is added to the reaction mixture continuously, at the same time as the monomers. The quantity must be such that, at any given moment, the proportion of the area of particles covered is less the 1/1. This avoids the formation of new particles and enables the particles of core polymer to be coated.

The periphery forming monomers may be copolymerized in the same reaction medium as the core. In this case, the quantity of water required for both polymerization processes may be added before the first polymerization, allowance being made for the concentration of the final latex desired; alternatively the water may be added in two stages, before each polymerization process or, yet again, continuously at the same time as the emulsifier.

The periphery forming monomers may equally be copolymerized in a second, independent operation, in which case the latex of core polymer is placed in the water as a seed, with the addition of initiator and then the continuous and simultaneous introduction of the mixture of monomers and the emulsifier.

The copolymerization temperature, from 5° to 90° C, is the same as that used for polymerizing the core, if the initiator is the same or if it has the same decomposition temperature as the one which initiates polymerization of the core. The temperature may be different if the initiator has a different decomposition temperature.

The latices, according to the method of the invention, are very stable during storage; they may be kept, often for periods of over 12 months, without the dispersion being destroyed. They are also mechanically stable and can be handled and transported, particularly by pumps, without deterioration of the emulsion.

The sizes of the particles in the latices obtained are uniform, from 0.2 to 2 μm, and may be controlled and thus easily adapted to the application envisaged. In the case of fixing proteins, for example, the process enables the size of the particles to be adjusted to that of the proteins.

Furthermore, since the —CN groups are at the surface, they are very easily hydrogenated in an aqueous medium, without the emulsion being destroyed, as by any known methods such as those described in U.S. Pat. No. 2,456,428 and in the article "Catalytic hydrogenation of butyronitrile" by H. Greenfield — Industrial Engineering Chemistry 6 (1967) p. 142. The particles of the latices obtained in this way have amine functions which are distributed regularly over the surface and are reproducible.

Moreover, by using the appropriate emulsifier, the latices can be used at varying pH levels, while still remaining stable.

The latices have applications in biology, particularly as carriers for proteins, either as they are, by physical adsorption, in which case the disadvantages of this type of attachment, viz. the development with the passage of time and the poor durability, sensitivity and reliability of the reagents are minimized by the polarity of the —CN groups, which makes the bonds more stable; or, after hydrogenation, by covalent chemical bonds.

The following examples will not be given by way of illustration, but not by way of limitation of the invention:

EXAMPLE 1

The following are placed in a 4 liter reactor:
1,221 g of water
90 g of a 5% by weight aqueous solution of potassium laurate
720 g of freshly distilled styrene.

Air is eliminated by passing through a stream of nitrogen, then the reaction mixture, which is agitated, is heated to 75° C and this temperature is maintained throughout the reaction.

As soon as the temperature reaches 75° C, 60 g of water containing 1.2 g of potassium persulphate in solution is added and the mixture is allowed to polymerize for 3 hours.

A mixture of 180 g of styrene and 58 g of acrylo nitrile and 30 g of a 5% by weight aqueous solution of potassium laurate are then added continuously at a constant flow rate for 1 hour.

6 hours later the reaction mixture is cooled.

With a conversion rate of 99% by weight for the monomers at the periphery, a latex is obtained with a 40% by weight concentration of particles; examination under an electron microscope shows substantlly all of the particles to have a diameter of 0.3 μm.

Appropriate investigation of the particles with an electron microscope reveals the presence of styrene-acrylo nitrile copolymer at the periphery of particles where the core consists of polystyrene. The —CN groups are thus at the surface.

The nitrogen concentration is found, by microanalysis, to be 1.55% by weight of all the polymers; this corresponds to 5.86% of copolymerized acrylo nitrile, i.e. 2.88% by weight of —CN groups relative to all the polymers.

The latex is hydrogenated. Infra-red spectrography shows the absorption band of —CN groups at 2240 $cm^{-1}$ to have disappeared in favor of the band of —$NH_2$ groups at 3400 $cm^{-1}$.

EXAMPLE 2

The procedure of Example 1 is followed, but the mixture of 180 g of styrene and 58 g of acrylo nitrile is replaced by a mixture of 145 g of styrene and 93 g of methacrylo nitrile.

The conversion rate is 95% by weight.

The concentration of the latex is 39% by weight.

All particles of the latex have a diameter of 0.3 μm.

The copolymer is at the periphery of the particles.

Microanalysis gives 1.20% of nitrogen, corresponding to 5.74% of methacrylonitrile, i.e. 2.22% of —CN groups.

EXAMPLE 3

Example 1 is repeated with 720 g of methyl methacrylate without any stabilizer, instead of the 720 g of styrene.

The conversion rate is 95% by weight. The concentration of the latex is 39.2% by weight. The latex obtained is examined in an electron microscope and all the particles are found to have a diameter of 0.6 μm.

The particle is formed of a core of methyl methacrylate, with the styrene-acrylo nitrile copolymer at the periphery.

The nitrogen content is 1.50%, given 5.68% of acrylo nitrile and 2.79% of —CN groups.

EXAMPLE 4

Example 1 is repeated but 7.2 g of divinylbenzene in a 65% by weight aqueous solution is added at the same time as the 720 g of styrene.

The conversion rate is 97% by weight.

The concentration of the latex is 40% by weight.

The latex particles have a diameter of 0.3 μm.

The nitrogen concentration is 1.47%, that is to say, there is 5.56% of acrylo nitrile and 2.73% of —CN groups.

EXAMPLE 5

Preparation of a latex of calibrated core polymer.

The following are placed in a 10 liter reactor:
2220 g of water
50 g of distilled styrene
40 g of a 5% by weight aqueous solution of potassium laurate
4 ml of a 20% aqueous solution of ammonia.

Air is eliminated by passing through a stream of nitrogen, then the reaction mixture, which is agitated, is heated to 75° C and this temperature if maintained throughout the reaction.

As soon as the temperature reaches 75° C, 100 g of water with 0.6 g of potassium persulphate dissolved in it is added, and the mixture is allowed to polymerize for 3 hours.

2,590 g of styrene and 1,190 g of a 2% by weight aqueous solution of potassium laurate are then added continuously, at a constant flow rate, over 6 hours.

1 hour later the reaction mixture is cooled.

The concentration of particles in the latex obtained is 42% by weight. Examination in an electron microscope shows all the particles to have the same diameter, viz. 0.43 μm.

Preparation of the latex with —CN groups.

The following are placed in a 4 liter reactor:
900 g of water,
530 g of the previously obtained latex.

Air is eliminated by passing through a stream of nitrogen, then the dispersion is agitated and heated to 75° C and this temperature is maintained throughout the reaction.

As soon as the reaction mixture reaches 75° C, 30 g of water with 0.3 g of potassium persulphate dissolved in it is added. The following are then added continuously, at a constant flow rate over 4 hours:
a mixture of 90 g of styrene and 29 g of acrylo nitrile,
20 g of a 5% aqueous solution of potassium laurate.

2 hours later the reaction mixture is cooled.

The conversion rate of the monomers at the periphery is 95% by weight.

The concentration of particles in the latex is 21.1% by weight.

The particles have the same diameter, viz, 0.49 μm.

The nitrogen concentration is 2.1%, that of acrylo nitrile 7.95% and that of the —CN groups 3.9%.

I claim:

1. Latices of polymer particles in aqueous dispersion having a uniform diameter within the range of 0.2 to 2 μm and comprising a core selected from the group consisting of a vinyl homopolymer, and a vinyl copolymer, and a periphery formed of a copolymer having —CN groups.

2. Latices as claimed in claim 1 in which the core represents 50 to 90% by weight of the particle.

3. Latices as claimed in claim 1 in which the vinyl monomer of the polymer and copolymer is selected from the group consisting of styrene, methyl styrene, vinyl toluene, ethylvinyl benzene, alkylacrylates and methacrylates having from 1 to 10 carbon atoms in the alkyl group and in which the diene monomer is a diene.

4. Latices as claimed in claim 1 in which, the vinyl homopolymer, the vinyl copolymer and the vinyl-diene copolymer are cross-linked.

5. Latices as claimed in claim 1 in which the periphery represents 10 to 50% by weight of the particle.

6. Latices as claimed in claim 1 in which the periphery comprises a copolymer of a vinyl or diene monomer with a monomer containing —CN groups.

7. Latices are claimed in claim 6 in which the monomer containing —CN groups represents 20 to 45% by weight of the copolymer and is selected from monomers having the general formula

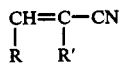

in which R and R', which may be similar or different, represent an atom selected from the group consisting of hydrogen, a $C_1 - C_5$ alkyl group and an aryl group.

8. Latices as claimed in claim 6 in which the monomer containing —CN groups is selected from the group consisting of acrylo, methacrylo, ethacrylo, crotyl or cinnamyl nitrile.

9. A method of preparing latices of polymers of claim 1 comprising polymerizing one or more vinyl monomers or a mixture of vinyl monomers containing less than 15% by weight diene monomer in aqueous emulsion in the presence of an initiator and at least one emulsifier to form the core and then polymerizing a mixture of a vinyl or diene monomer and a monomer containing —CN groups in aqueous emulsion in the presence of an initiator and at least one emulsifier, with continuous introduction of the monomers and emulsifiers to form the periphery.

10. A method as claimed in claim 9 in which, in the preparation of the core polymer, the vinyl monomers are selected from the group consisting of styrene, methyl styrene, vinyl toluene, ethylvinyl benzene, $C_1 - C_{10}$ alkylacrylates and methacrylates.

11. A method as claimed in claim 9 in which the diene monomers are selected from the group consisting of a butadiene.

12. A method as claimed in claim 9 in which, in the preparation of the core polymer, a cross-linking vinyl monomer is added to the vinyl monomer or monomers or to the mixture of vinyl and diene monomers in a proportion ranging from 0.1 to 10% by weight of the monomers.

13. A method as claimed in claim 9 in which the initiator is present in the ratio of 0.01 to 3% by weight of the monomer or monomers in preparation of the core polymer and in which the initiator is water soluble or yields water soluble radicals.

14. A method as claimed in claim 13, in which the initiator is selected from the group consisting of persulphate of ammonia or potassium, azo-nitriles, hydrogen peroxide, and redox systems.

15. A method as claimed in claim 9 in which the emulsifier used in preparing the core polymer is an anionic emulsifier and is present in an amount within the range of 0.1 to 10% by weight of the monomer or monomers.

16. A method as claimed in claim 15 which includes a non-ionic emulsifier in addition to the anionic emulsifier.

17. A method as claimed in claim 9 in which the vinyl or diene monomer used in preparing the peripheral copolymer is selected from the group consisting of styrene, methyl styrene, vinyl toluene, ethylvinyl benzene and $C_1 - C_{10}$ alkylacrylates methacrylates, and a butadiene.

18. A method as claimed in claim 9 in which the monomer containing —CN groups has the formula

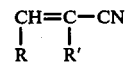

in which R and R', which may be the same or different, represent an atom selected from the group consisting of hydrogen, a $C_1 - C_5$ alkyl group and an aryl group.

19. A method as claimed in claim 18 in which the monomer containing —CN groups is selected from the group consisting of acrylo, methacrylo, ethacrylo, crotyl and cinnamyl nitrile.

20. A method as claimed in claim 18 in which the monomer containing the —CN group is present in an amount within the range of 20 to 45% by weight of the mixture of monomers.

21. A method as claimed in claim 9 in which the mixture of monomers used in preparing the peripheral copolymer represents 10 to 50% by weight of the total polymer.

22. A method as claimed in claim 9 in which the initiator used in preparing the peripheral copolymer is water soluble or yields water soluble radicals and is selected from the group consisting of persulphates of ammonia or potassium, azo-nitriles, hydrogen peroxide and redox systems and in which the initiator may be the same or different from that used in preparing the core polymer.

23. A method as claimed in claim 22 in which the initiator is present in an amount within the range of 0.01 to 3% by weight of the monomers.

24. A method as claimed in claim 9 in which the emulsifier used in preparing the peripheral copolymer is anionic, and may be the same or different from that used in preparing the core polymer.

25. A method as claimed in claim 24 in which the emulsifier is introduced in an amount such that at any given moment the particle-covering ratio is less than 1.

26. A biological carrier for proteins comprising the latices of claim 1.

27. Latices as claimed in claim 1 in which the vinyl copolymer is a copolymer of two or more vinyl monomers or a copolymer of one or more vinyl monomers with less than 15% by weight of a diene monomer.

* * * * *

UNITED STATES PATENT OFFICE
CERTIFICATE OF CORRECTION

Patent No. 4,086,199   Dated April 25, 1978

Inventor(s) Jean-Claude Daniel

It is certified that error appears in the above-identified patent and that said Letters Patent are hereby corrected as shown below:

Col. 1, line 42, change "from" to -- form --

Col. 2, line 4, change "are" to -- can --

Col. 6, line 65 change "diene" to -- butadiene --

Signed and Sealed this

Fifth Day of September 1978

[SEAL]

Attest:

RUTH C. MASON
*Attesting Officer*

DONALD W. BANNER
*Commissioner of Patents and Trademarks*